Patented Aug. 10, 1937

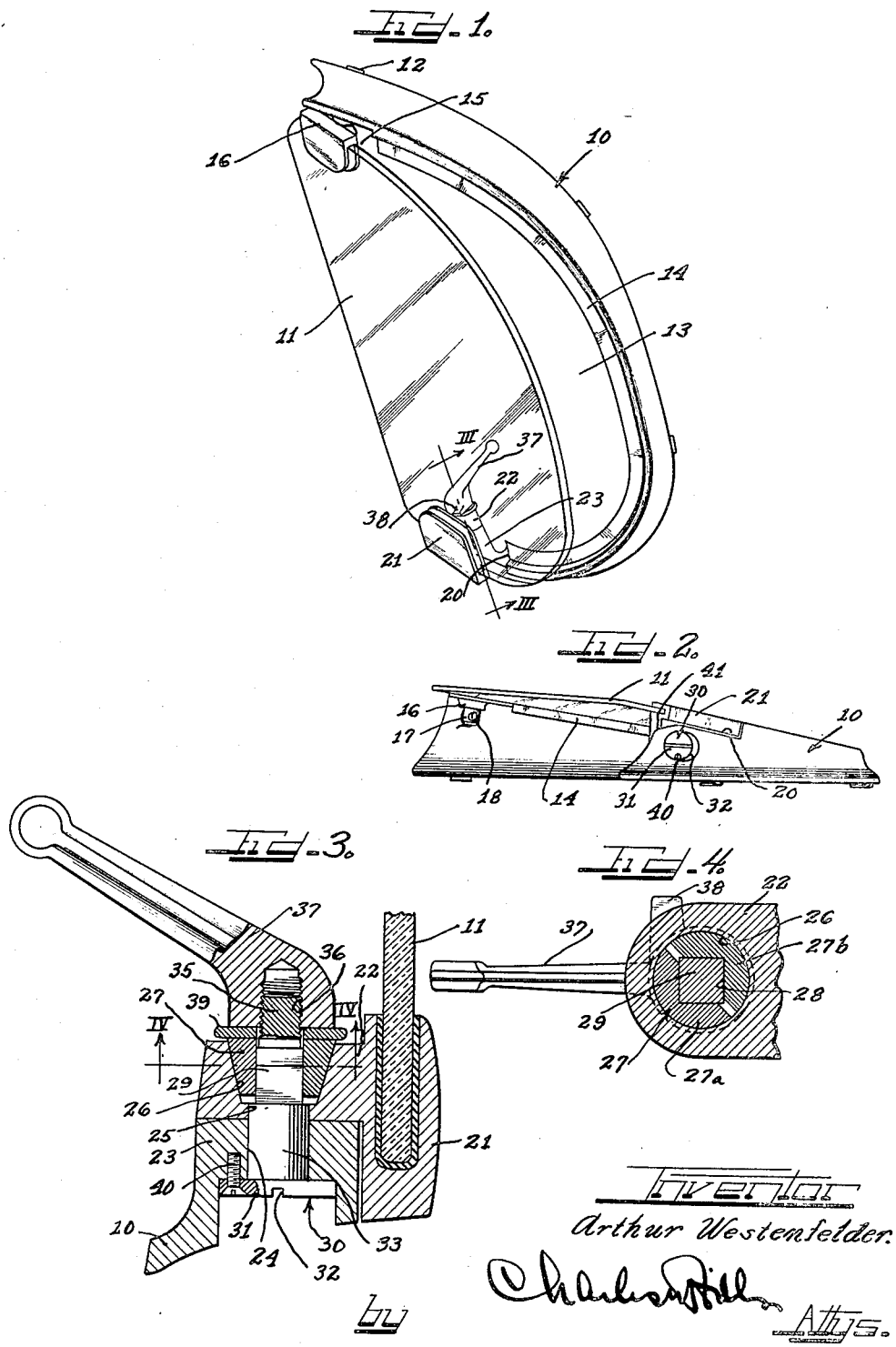

2,089,458

UNITED STATES PATENT OFFICE 2,089,458

WINDOW DEFLECTOR MOUNTING

Arthur Westenfelder, Buffalo, N. Y., assignor to Houde Engineering Corporation, Buffalo, N. Y., a corporation of New York Application August 22, 1935, Serial No. 37,296

2 Claims. (Cl. 296—84)

This invention relates to a deflector for use in connection with vehicle windows and more particularly to a pivotal mounting for a shield of the deflector.

An object of this invention is to provide an improved pivotal mounting for a shield of a vehicle window deflector.

Another object of this invention is to provide a vehicle window deflector with improved means for locking the shield in different adjusted positions.

A still further object of the invention relates to the provision of manually operable lock means for a deflector of the foregoing type which means is accessible from the interior of the vehicle to release the shield of the deflector for adjustment or to lock it in the desired adjusted position.

In accordance with the general features of this invention there is provided a deflector or window wing for use in connection with a vehicle window which deflector includes an angular frame having a shield pivotally supported at its ends in the frame and including a means associated with one of the pivots of the shield for locking the shield in different adjusted positions, including a frusto-conical gland element and means for tightening the element on its seat after the shield has been adjusted so as to bind the shield frictionally against pivotal movement.

Another feature of the invention relates to the provision of handle means disposed back of the shield and readily accessible from the interior of the vehicle for operating the locking means.

Other objects and features of this invention will more fully appear from the following detail description taken in connection with the accompanying drawing which illustrates a single embodiment of the invention and in which Figure 1 is a perspective view of a deflector embodying the features of this invention and in which the shield is shown as being locked in open position;

Figure 2 is a bottom view of the deflector shown in Figure 1 but illustrating the shield in its closed position;

Figure 3 is an enlarged fragmentary sectional view taken on the line III—III of Figure 1 looking in the direction indicated by the arrows and illustrating my novel means for locking the shield in an adjusted position; and Figure 4 is a transverse sectional view taken on the line IV—IV of Figure 3 looking upwardly.

As shown on the drawing:

Reference character 10 designates generally a frame which is of substantially a wedge shape in its entirety and which more specifically has such a configuration as to conform with the stream-line shape of the forward end of a vehicle window. This frame has disposed in it a glass or transparent shield 11 pivotally supported at its ends in the frame. Also the deflector frame has a plurality of clips 12 secured to its rear edge for enabling the shield to be attached to a portion of a vehicle.

My invention relates to the construction of one of the pivotal supports for the deflector whereby the deflector may be locked in different adjusted positions.

While I have illustrated the frame 10 as being provided with clips 12 for enabling its attachment to a portion of the vehicle, it is of course to be understood that the frame may be secured by other means such, for example, as bolts or cap screws to the vehicle. For this reason a description of the detail structure of the clips and the manner in which these clips are mounted on the vehicle is not thought necessary in order for my invention to be fully understood.

The shield 11 is fitted in an opening 13 in the frame 10, which is of the same general contour as that of the frame or, in other words, is a streamlined opening. The opening 13 is defined by a seat 14 for the shield.

The upper end of the frame 10 is notched at 15 so as to accommodate a bracket member 16 secured to the upper end of the shield 11. This bracket member 16 has a lateral extension 17 (Figure 2) which is pivotally mounted on a pin 18 secured to and projecting inwardly from the upper end of the frame 10.

The lower end of the frame 10 is notched out at 20 (Figure 1) in order to accommodate a bracket member 21 which includes an inwardly extending projection 22 seated on a shouldered portion 23 of the lower end of the frame 10 (Figure 3). This projection 21 cooperates with the shoulder portion 23 and providing a pivotal mounting for the lower end of the shield, which mounting embodies the features of my present invention.

The portion 23 has an opening 24 which is aligned with an opening 25 in the projection 22. This opening 25 is enlarged at its upper end to provide a frusto-conical seat 26 on which is disposed a frusto-conical gland element 27 (Figure 3). This gland element 27 comprises two halves 27a and 27b as shown in Figure 4. Also the gland element 27 has a squared central aperture 28 in which is fitted a squared portion 29 of a swivel member designated generally by the reference numeral 30.

The swivel member 30 has an external head 31 provided with a screw driver slot 32 by means of which the member may be rotated. This swivel member 30 also has an intermediate bearing portion 33 which is fitted in the opening 24 in the frame portion 23 and is connected to the squared portion 29. The upper end of the member 30 is threaded as indicated at 35 so that it may be screwed into a threaded opening 36 in a handle 37. The handle 37, as shown in Figures 1 and 4 has a laterally projecting lug 38 adapted to strike an inner surface of the bracket member 21 to limit the outward pivotal movement of the handle 37. This handle is disposed on the inner side of the shield so that it is readily accessible from the interior of the vehicle.

Positioned between the gland element 27 and the handle 37 is a flat washer 39 which maintains the gland element parts 27a and 27b in aligned transverse position as they are forced downwardly over the inclined surface of the frusto-conical opening 26, when the handle is moved to a locking position.

In assembling this lower mounting, the swivel member 30 is inserted in the aligned openings and the handle is positioned directly over the threaded end 35 of this member. Thereafter upon the member 30 being turned by a screw driver it draws the handle 37 downwardly, thus forcing the gland elements 27a and 27b downwardly in the frusto-conical opening 26. This swivel member 30 is adjusted to a given position in which position a cap screw 40 is inserted through an opening in the head 31 and threaded into the body of the frame portion.

By turning the handle 37 it is possible to reduce the binding engagement between the frusto-conical element 27 and its seat to a sufficient extent so that the shield 11 may be swung on its pivot. Inward movement of the shield 11 is limited by the shield coming into engagement with its seat 14. Outward pivotal movement of the shield is limited by the bracket member 21 striking a rounded shoulder 41 on the lower end of the frame (Figure 2). Also the handle 37 is prevented from contacting the shield 11 by reason of its lug 38 striking an inner surface of the bracket member 21.

After the shield has been adjusted to the desired position, it may be locked against further movement by tightening the handle 37 on the threaded upper end 35 of the bearing member 30. This tightening of the frictional pivotal mounting is effected solely by the manipulation of the handle 37.

The locking of the shield against accidental displacement from its adjusted position or against further movement is effected by reason of the frictional or binding action which ensues from the forcing of the gland element 27 downwardly into tight engagement with the inclined surface of the frusto-conical opening 26. The elements which contribute to this locking or binding action are of a minimum number and of a simple construction. Moreover by reason of this pivotal mounting being disposed behind the shield it of course follows that when the shield is in its closed position these elements are somewhat sheltered from the effects of the natural elements.

Now while I desire it understood that while I have illustrated and described in detail the preferred embodiment of my invention, the invention is not to be thus limited but only insofar as defined by the scope and spirit of the appended claims.

I claim as my invention:

1. In a deflector for an automotive vehicle including a frame, and a shield pivotally supported at its ends in said frame, means associated with one of the pivots of said shield for locking it in different adjusted positions including a separate frusto-conical gland element, a seat for said element and means for tightening said element on its seat after the shield has been adjusted so as to bind frictionally the shield against pivotal movement, said gland element comprising two opposite separate halves adapted to be wedgingly forced into engagement with said seat.

2. In a deflector for an automotive vehicle including a frame, and a shield pivotally supported at its ends in said frame, means associated with one of the pivots of said shield for locking it in different adjusted positions including a frusto-conical gland element, a seat for said element and means for tightening said element on its seat after the shield has been adjusted so as to bind frictionally the shield against pivotal movement, said means for tightening the element on its seat comprising a bearing member extending through a squared opening in the gland element, means for holding this member and the gland element connected thereto against relative rotation, and an adjustable handle threadingly connected to the upper end of the bearing member, said handle being disposed on the rear side of the shield so as to be accessible from the interior of the vehicle, said handle also including means for preventing it from being rotated into contact with the shield.

ARTHUR WESTENFELDER.